United States Patent [19]

Lindgren, Sr. et al.

[11] Patent Number: 4,738,863
[45] Date of Patent: Apr. 19, 1988

[54] CHEESE EXTRUSION DEVICE AND METHOD

[76] Inventors: Donald R. Lindgren, Sr., 1869 E. Shore Dr., Green Bay, Wis. 54302; Donald S. Lindgren, Jr., 1035 S. Webster, Green Bay, Wis. 54301

[21] Appl. No.: 67,492

[22] Filed: Jun. 29, 1987

[51] Int. Cl.$^4$ .......................... A23C 19/00; A23P 1/00
[52] U.S. Cl. ........................................ 426/582; 99/453; 99/465; 425/376 R; 425/436 R; 425/444; 426/516
[58] Field of Search ....................... 426/512, 516, 582; 99/453, 465; 425/84, 190, 376 R, 436 R, 444

[56] References Cited

U.S. PATENT DOCUMENTS

| | | | |
|---|---|---|---|
| 4,317,649 | 3/1982 | Boellmann | 425/150 |
| 4,339,468 | 7/1982 | Kielsmeier | 426/582 |
| 4,373,889 | 2/1983 | Brown | 425/150 |
| 4,439,129 | 3/1984 | Long et al. | 425/352 |
| 4,465,452 | 8/1984 | Masuzawa | 425/308 |
| 4,568,554 | 2/1986 | Derode | 426/582 |
| 4,613,294 | 9/1986 | Rose et al. | 425/444 |
| 4,616,988 | 10/1986 | Muzzarelli | 425/190 |
| 4,646,602 | 3/1987 | Bleick | 83/408 |

*Primary Examiner*—George Yeung
*Attorney, Agent, or Firm*—Recka, Joannes & Faller

[57] ABSTRACT

A device and method for forming pieces of cheese weighing several ounces or less while retaining the skin normally formed on the cheese piece in the cooling process, and at the same time obtaining a desired internal structure. Warm plastic cheese is extruded into a first mold having a sliding low friction end cap, by means of a screw extruder, at 1000 pounds per square inch; the first mold is then positioned over a second mold having a plurality of forming chambers formed therethrough, the second mold is made of UHMW and the volume of the second mold is slightly less than the volume of the first mold. Pressure at 3000 pounds per square inch is applied to the mold end cap while the cheese in the first mold is still plastic, forcing the cheese into the forming chambers; the cheese pieces formed are retained in the forming chamber until a skin is formed and then they are ejected into a brining tank.

11 Claims, 6 Drawing Sheets

CHEESE EXTRUSION DEVICE AND METHOD

BACKGROUND OF THE INVENTION

1. Field of the Invention

The Invention is a cheese extruding machine for forming pieces of cheese weighing several ounces or less.

2. Related Art

Petitioner's invention is used to make small pieces of cheese of uniform density and of exact weights and dimensions at high speed, while retaining the skin which is formed on the cheese piece as it is cooled.

The device was designed for forming small pieces of Italian type cheeses such as mozzarella, provolone or scamorza.

In prior art devices, warm plastic cheese is extruded into a stainless mold. A 40 pound block is commonly formed. The mold is chilled, forming a skin on the cheese block which helps hold the shape of the block when the block is ejected from the mold. Such a device is shown in U.S. Pat. No. 4,613,294. The block formed is then put into a brining tank or trough.

After the block has been brined, it can be cut into smaller rectangular pieces by a harp. Such a harp can be seen in U.S. Pat. No. 4,646,602.

Pieces of cheese that have been cut by a harp cannot be bent without cracking. Cutting the block removes the skin formed on the block while cooling.

The skin formed on cheese, during the forming process, has useful properties. A piece of cheese retaining the skin formed can be bent without cracking. It is an object of this invention to make small pieces of cheese retaining the skin formed in cooling.

The density of the cheese in 40 pound blocks and in blocks formed directly out of the screw extruder varies. As the screws slip, cheese consistency varies in the cheese column formed in the extruder.

Brining time required is a function of the size of the cheese block to be brined. A small piece of cheese may be brined in several minutes, while a 40 pound block may require 24 hours of brining. Brining the cheese, chills, salts, hardens and flavors the cheese. It is an object of this invention to make small pieces of cheese and to brine after formation, to lessen brining time.

Small pieces of cheese may be formed by using an extrusion process, as shown in U.S. Pat. No. 4,339,469. In such a process, a screw extruder is used to force a column or rope of cheese out of an extrusion hole, into a brining tank. The ropes, after brining, are then cut to desired sizes.

While the extrusion system retains the useful skin on all but the cut ends, shapes that can be extruded are limited. As the cheese is extruded out of the high pressure extruder into the atmospheric pressure brining tank, the cheese expands unpredictably and takes on irregular shapes. Density of the extruded cheese rope formed by the extruder varies with slippage of the screw extruder. The cheese then must be cut. It is difficult to cut the cheese ropes formed to exact weight.

Petitioner's device forms a surface skin and an internal structure in the cheese piece formed, by working the cheese, that allows the piece to be bent and handled in further processing.

Both the harp and the extruder can be used to produce small individual serving pieces of varying sizes. Because the pieces formed by the harp or extruder vary in size and in density, they must be sold by weight. Size variation also complicates feeding of the individual pieces to other machines.

The invention extrudes warm plastic cheese by means of a screw extruder into a first mold, then while the cheese in the first mold is still plastic, positions the first mold over a second mold and under great pressure, extrudes the cheese in the first mold into the second mold.

The invention is a cheese extruder specifically designed for the production of cheese pieces weighing several ounces or fractions of an ounce.

The extruder comprises a movable mold plate having two adjustable molds mounted on it. The bottom of the molds are open to the entrance of cheese, forced into the mold by a screw extruder, the outlet of which is under and bears on the movable mold plate.

The top of the mold is closed off by a vertically movable mold cap plate.

As the plate moves back and forth over the cheese inlet, the inlet is open to one mold or to the other, or is blocked by the plate. A reciprocating device is shown in the specifications. A rotary mold plate system has been designed.

As one mold is positioned over the cheese inlet, the second mold is positioned over an extrusion mold which has a number of cheese extrusion holes formed in it. The extrusion mold reciprocates in a direction normal to the direction of movement of the mold plate.

The block of cheese formed in the mold carried by the mold plate, is forced out of that mold under pressure into the extrusion mold in which the desired shape and size of the finished piece has been formed. This works the cheese and compresses it.

The extrusion mold is then moved under an ejector plate mounted over a brine trough, and the formed pieces are ejected for brining.

DETAILED DESCRIPTION OF THE PREFERRED EMBODIMENT

The device comprises the following elements:

| | |
|---|---|
| Frame | 20 |
| Cheese extruder pipe | 22 |
| Outlet | 24 |
| Outlet flange | 26 |
| UHMW pad | 28 |
| Housing | 30 |
| Housing | 32 |
| Control Box | 34 |
| Housing Frame | 36 |

-continued

| | |
|---|---|
| Housing Frame | 38 |
| Legs | 40 |
| Legs | 42 |
| Ejector mount | 44 |
| Ejector mount | 46 |
| Brining trough | 48 |
| Support rail | 50 |
| Support rail | 52 |
| Support rail bottom surface | 54 |
| Support rail bottom surface | 56 |
| Support rail height adjusting device | 57 |
| Mold plate | 58 |
| Mold | 60 |
| Mold | 62 |
| Flange | 64 |
| Mold plate retainer | 66 |
| Mold cap | 68 |
| Mold cap rub rails | 70 |
| Secondary molding station | 72 |
| Second molding station | 74 |
| Extrusion mold | 76 |
| Extrusion mold | 78 |
| Support leg | 80 |
| Support leg | 82 |
| Support leg | 84 |
| Support leg | 86 |
| Forming chambers | 88 |
| Venting plate | 90 |
| Discharge plate | 92 |
| Scraper | 93 |
| Cheese | 94 |
| Hydraulic cylinder | 96 |
| Spring biased support | 98 |
| Spring biased support | 100 |
| Weeper holes | 102 |
| Hydraulic cylinder | 104 |
| Ejector plate | 106 |
| Ejector fingers | 108 |
| Ejector plate aligner | 109 |
| Hydraulic cylinder | 110 |
| Attachment | 112 |
| Hydraulic cylinder | 114 |
| Hydraulic cylinder | 116 |

Petitioner's device is used to make small pieces of cheese, to close tolerances in weight and dimensions, and an unbroken surface skin.

Figure 1:
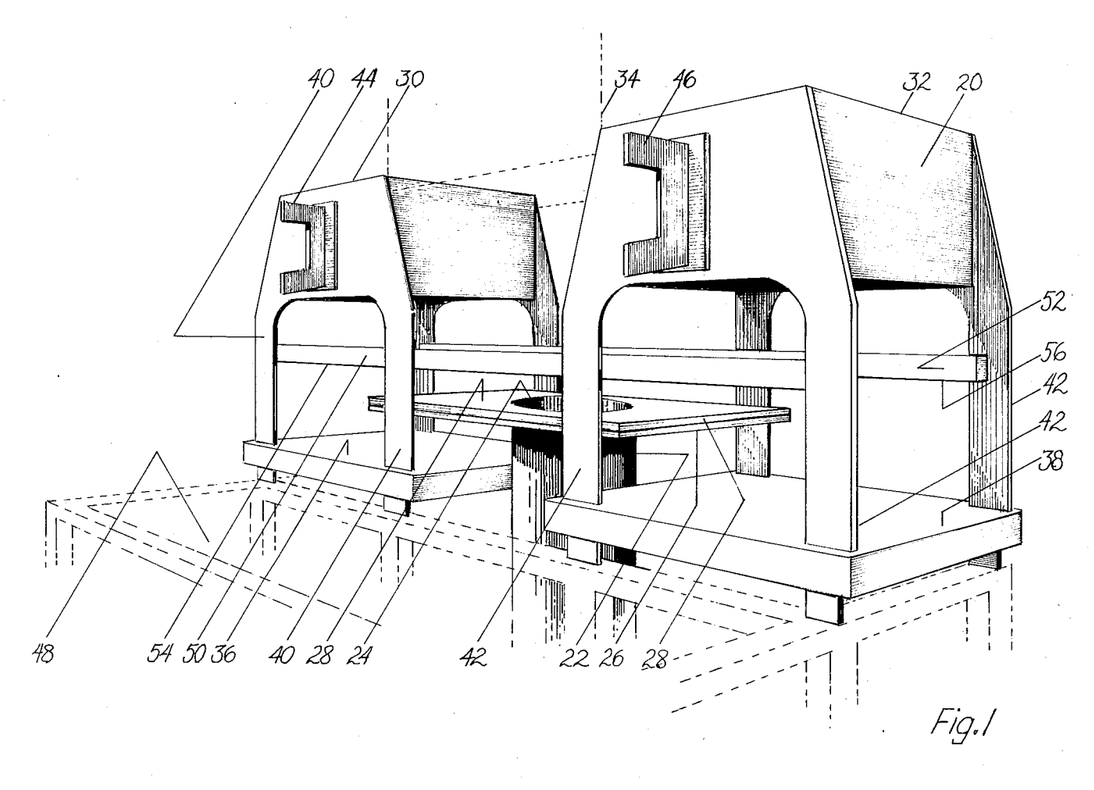
FIG. 1 is a disassembly view of one embodiment of the invention showing the frame and housing within which the mold plate reciprocates.

FIG. 1 shows frame 20, of the device. Frame 20 straddles plastic cheese extruder pipe 22. Warm plastic cheese is forced through a screw extruder, not shown, and flows out of outlet 24.

Outlet 24 is surrounded by flange 26. A low friction UHMW plastic pad 28 is mounted on top of flange 26.

At either side of pipe 22 are located housings 30 and 32. The hydraulic cylinders used to force the plastic cheese into the extrusion mold are mounted in these housings. Shown in dotted line at 34 is location of control box 34.

Housings 30 and 32 are connected to housing frames 36 and 38 by legs 40 and 42.

On the face of housing 30 and housing 32 are mounted ejector mounts 44 and 46.

In dotted line in FIG. 1 at 48 is shown the location of a brining trough; the extruded pieces of cheese are ejected into the brining trough.

Above UHMW pad 28 can be seen support rails 50 and 52.

The mold plate reciprocates above outlet 24, into housings 30 and 32. The mold plate slides across UHMW gasket or pad 28. The mold cap rub rails 70 bear on the bottom surface of support rails 50 and 52 when the mold is full.

Figure 2:
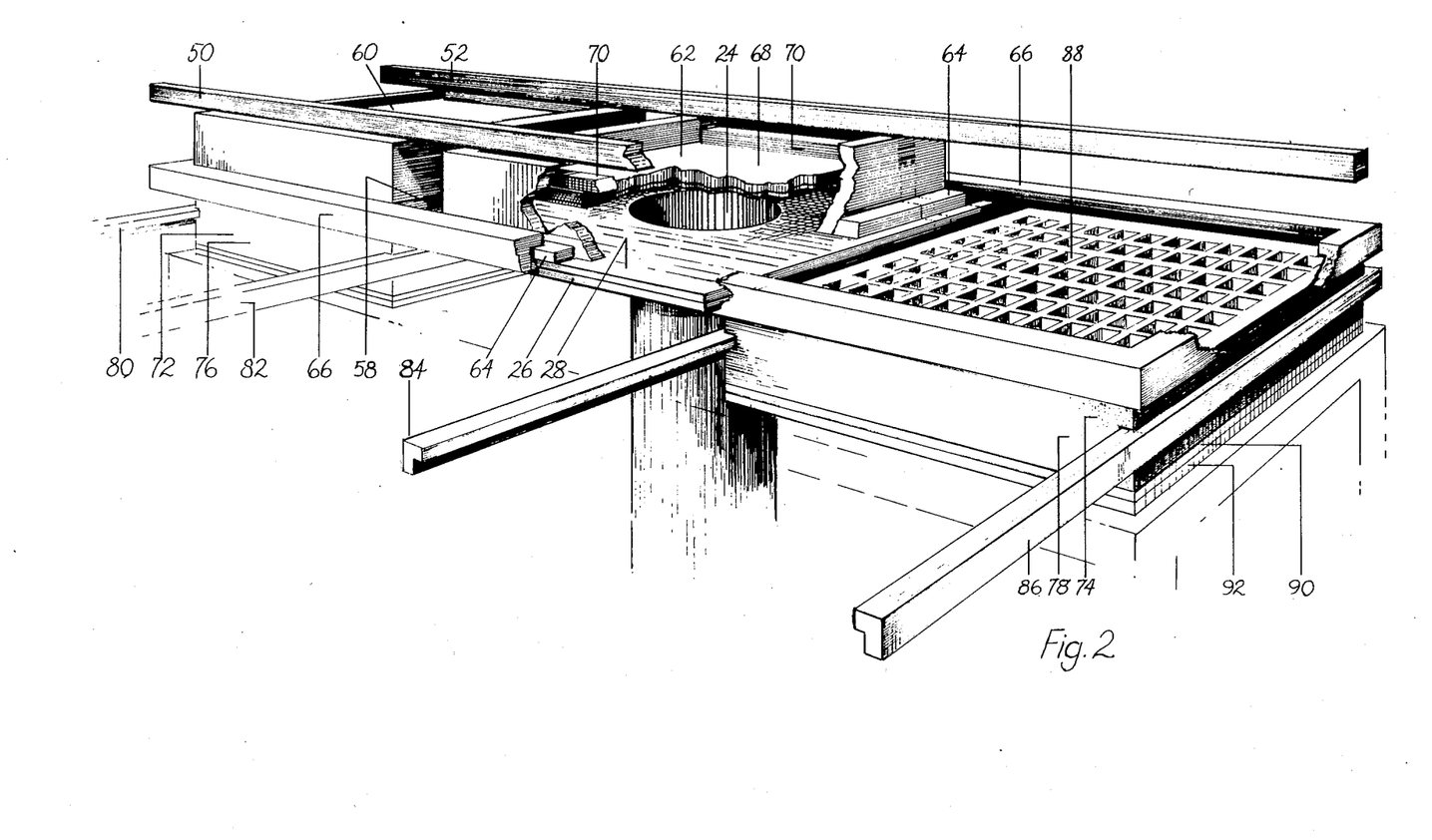
FIG. 2 is a disassembly view of the device with the housing removed to show operation of the device.

FIG. 2 is a view of the with housings 30 and 32 removed, to show operation.

Mold plate 58 has two molds 60 and 62 mounted thereon. Molds 60 and 62 are mounted within the perimeter of plate 60, leaving an outside flange 64, between molds 60 and 62. Mold plate retainer 66 is a rectangular L-shaped piece of steel which retains mold plate 58 as it reciprocates back and forth within the area defined by the mold plate retainer.

Molds 60 and 62 are open on the bottom, as can best be seen in FIG. 2. As cheese flows out of outlet 24, the cheese fills the mold. Mold cap 68 moves upward as cheese is extruded into the mold, filling the area of the mold. Mold cap 68 is a two inch thick piece of UHMW.

Mold cap rub rails 70 are UHMW plastic runners affixed to the top of the mold cap 68. As cheese is extruded into the mold 62, the cap rises until the runners contact support rail bottom surfaces 52 and 54.

The height of mold cap rub rails 70 can be varied to vary the amount of cheese forced into the mold. Support rails 50 and 52 can also be adjusted up or down by screw adjusters 57 to adjust the amount of cheese entering the mold.

Mold plate 58 is reciprocated back and forth over outlet 24 by a hydraulic cylinder not shown in FIG. 2.

Mold 60 can be stopped in two positions. In one position it is stopped over a secondary molding station 72. Mold 62 is stopped over outlet 24 or over secondary molding station 74 as can best be seen in FIG. 2.

At stations 72 and 74 are mounted extrusion molds 76 and 78.

Mold 78 is slidably mounted, as is mold 76. Mold 76 is reciprocated from its position beneath mold 60, on support legs 80 and 82. Mold 78 is reciprocated from its position beneath mold 62 on support legs 84 and 86. A hydraulic cylinder, not shown in this figure, is used to move extrusion mold 78 from beneath mold 62 after extrusion, to a second position, above a brining trough, for discharge of formed pieces.

Extrusion mold 78 shown in FIG. 2, is used to form 84 pieces of cheese of rectangular shape. The top of the forming chambers 88 can be seen in this figure.

The shapes formed can be star shaped, round or any two dimensional shape desired with length being fixed by the depth of the chamber.

At the bottom of extrusion mold 78 can be seen venting plate 90 and discharge plate 92.

Figure 3:
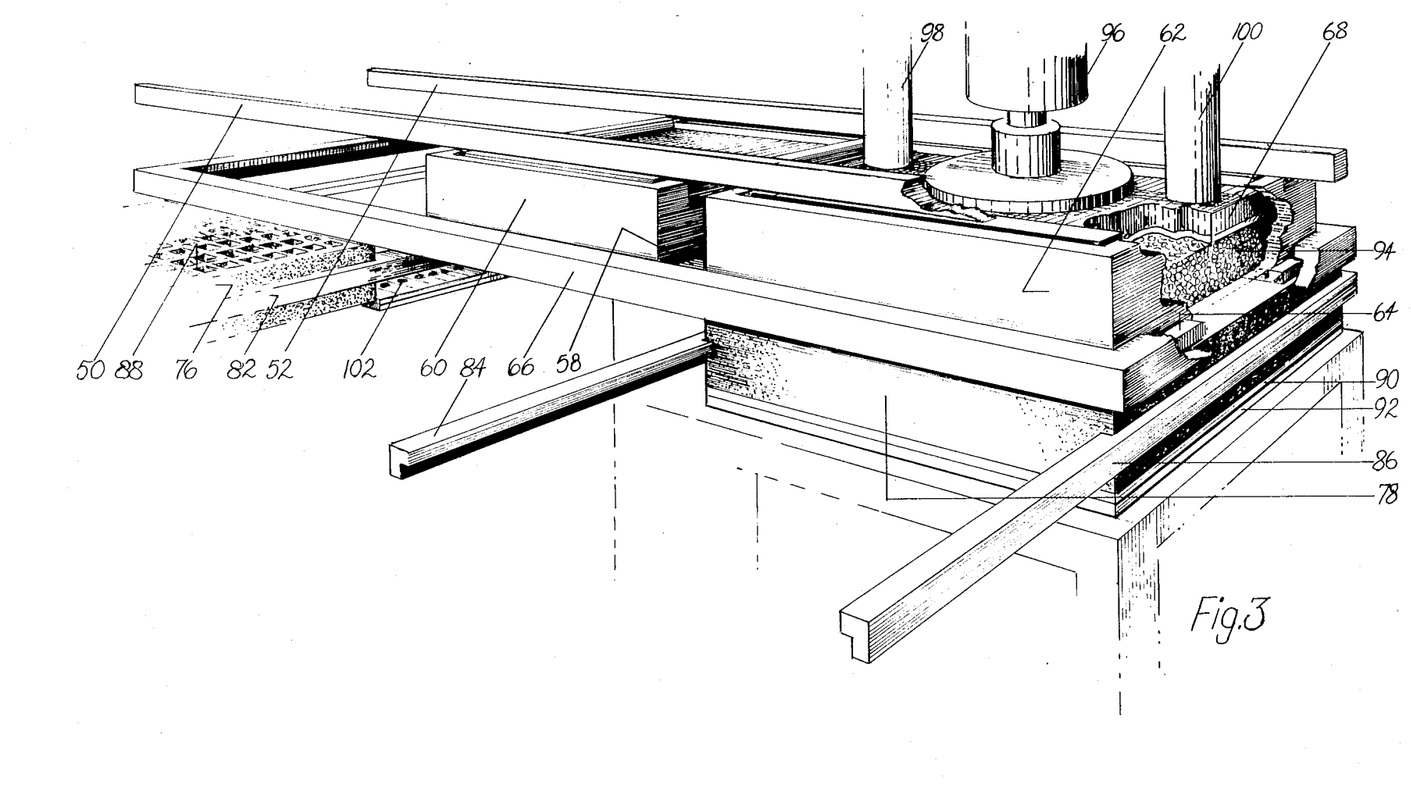
FIG. 3 is a disassembly view with housings removed to show filling of the extrusion mold.

FIG. 3 shows the device with the housings removed and at the point where hydraulic pressure is being used to fill extrusion mold 78.

A section is removed to show operation. Cheese 94, retained in mold 62, by mold plate 58, bearing on the bottom surface of support rails 56 and 54, is subject to pressure exerted by hydraulic cylinder 96, smaller spring biased supports 98 and 100 follow hydraulic cylinder 96 down and provide added support to mold cap 68 as force is applied.

The still plastic cheese contained within the mold 62 is forced into extrusion mold 78 with its forming chambers 88. Chambers 88 are open at the bottom and are located over weeper holes 102. As the hydraulic cylinder 96 presses down on mold cap 68, the plastic cheese is forced into forming chambers 88; as the cheese is formed into chambers 88, air is forced out of the chambers through weeper holes 102. At the end of the extrusion cycle a small amount of cheese is also forced out of weeper holes 102. The size of the small weeper holes and the volume of cheese in the first mold keeps all but a small amount of cheese from being forced out of the weeper holes. A small tail or flashing of cheese is formed at the weeper holes. The tail is shorn off as mold 78 is forced outward on legs 84 and 86 over a brining tank.

The cheese shapes formed by the double extrusion process have useful properties which aid in further processing. The pieces are of uniform density and have an unbroken surface skin.

At the left side of FIG. 3 can be seen mold 76 in position to have the formed shapes ejected.

Figure 4:
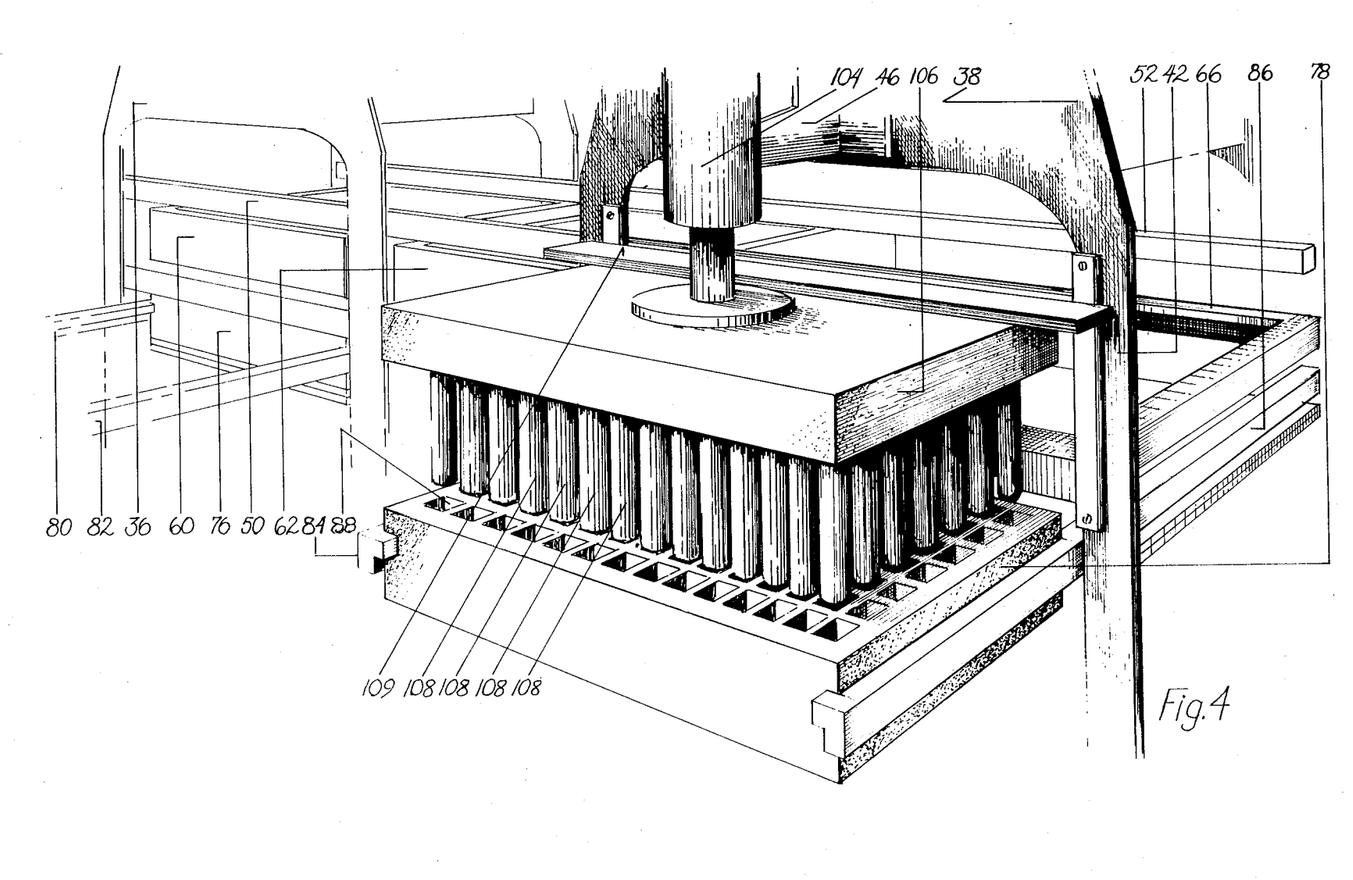
FIG. 4 is a view showing ejection of cheese pieces from the extrusion mold.

Ejection of formed cheese pieces can best be seen in FIG. 4. Hydraulic cylinder 104 is attached to 32, at mount 46. Cylinder 104 moves ejector plate 106 down; plate 106 has affixed to its bottom surface ejector fingers 108.

As cylinder 104 is energized to eject pieces from the extrusion mold 78, plate 106 moves down, forcing fingers 108 into the forming chambers 88, forcing the formed cheese pieces out of the mold and into a brining trough.

Figure 5:
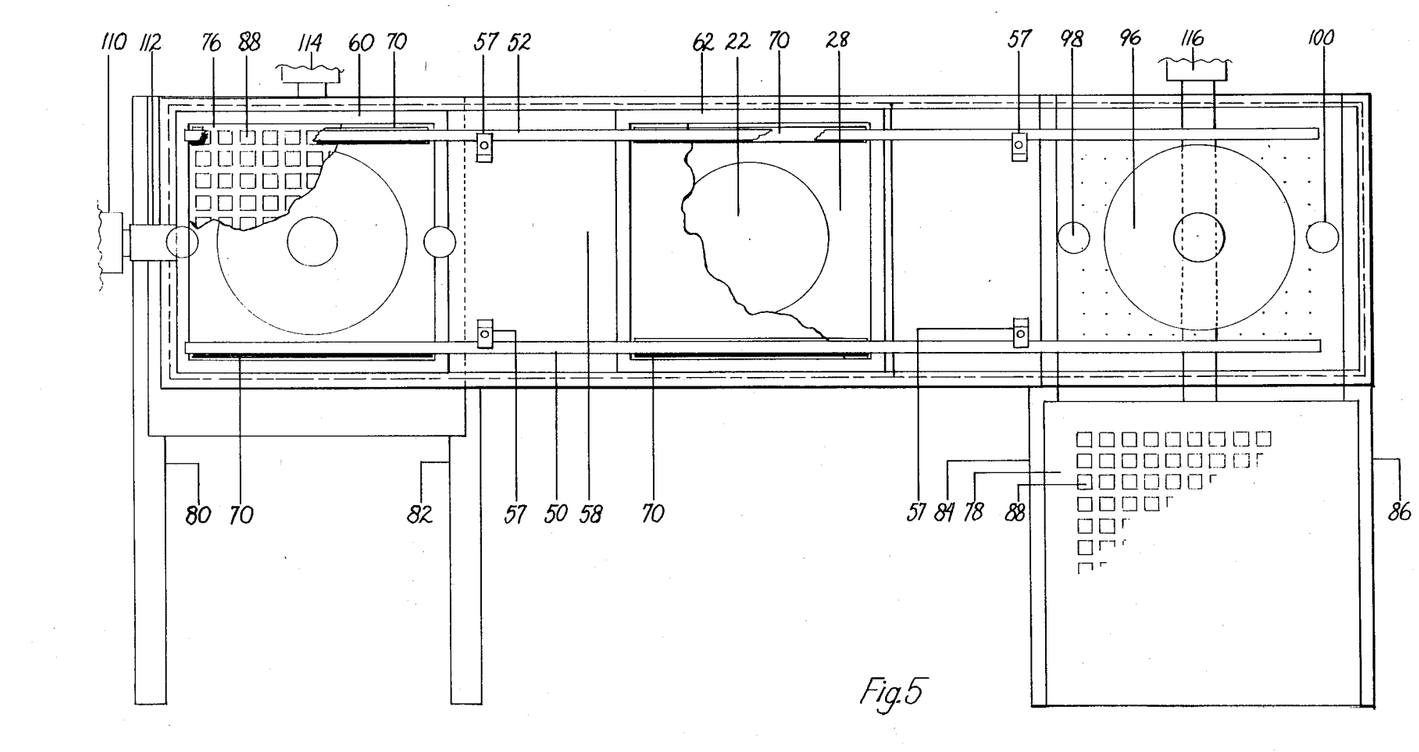
FIG. 5 is a section view taken through the device on a horizontal plane to show operation of hydraulic cylinders.

FIG. 5 is a section view, showing a section taken through the extruder on a horizontal plane. FIG. 5 best shows operation of the hydraulic cylinders to move the various molds in a horizontal plane.

Hydraulic cylinder 110 is affixed to mold plate 58 at 112. This cylinder 110 moves mold plate 58 back and forth across outlet 24.

Hydraulic cylinder 114 moves extrusion mold 76 back and forth on legs 80 and 82, from a position where mold 76 is under mold 60 to a second position under the discharge plate, to eject the formed pieces.

Hydraulic cylinder 116 moves extrusion mold 78 back and forth on legs 84 and 86, from a position under mold 62 to a second position under discharge plate 90.

Figure 6:
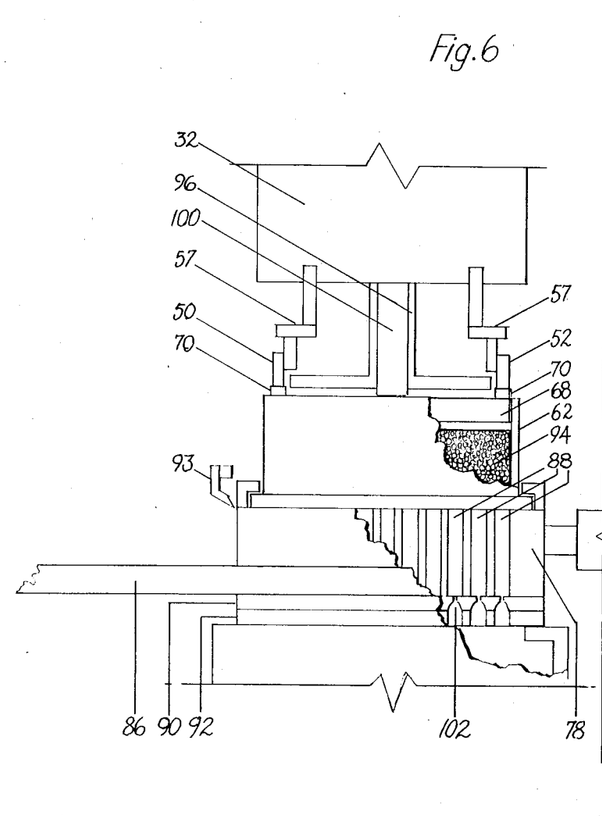
FIG. 6 is an end view of the device, in partial section taken from the right side.

FIG. 6 is an end view of the device with Section taken through mold 62 and extrusion mold 78. The view is taken from the right side. In FIG. 6, mold 62 containing warm plastic cheese 94 is positioned above extrusion mold 78.

As plunger 96 is actuated, plunger 96 forces cold cap 68 down, forcing the plastic cheese into forming chambers 88; pressure is applied until the entrapped air in chambers 88 is forced out, the mold filled, and a small amount of cheese forced out of weeper holes 102.

Hydraulic cylinder 96 is then withdrawn. Hydraulic cylinder 116 is engaged moving extrusion mold 78 outward on tracks 84 and 86. As the mold moves outward, the cheese tail or flashing extending into weeper holes 102 is sheered off, either falling out through the larger holes in discharge plate 92 or remaining to be forced out in the next compression cycle.

Scraper 93 extends across the surface of mold 78. As the mold is moved outward, scraper 92 scrapes off any cheese standing above chambers 88.

Figure 7:
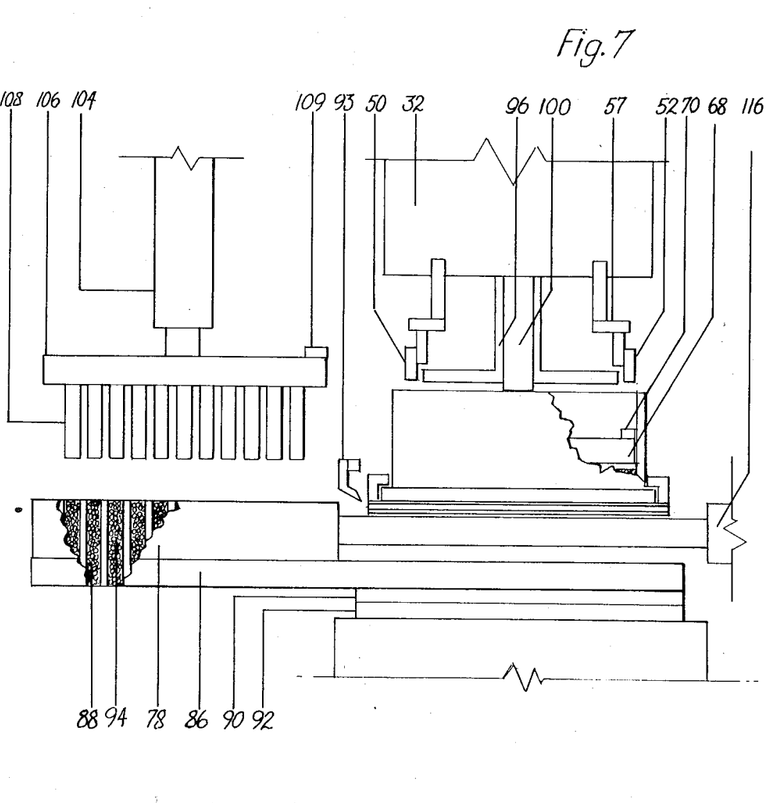
FIG. 7 is an end view with a section taken through the extrusion mold.

FIG. 7 is a side view with a section taken through extrusion mold 78. Formed cheese pieces can be seen in chambers 88. The small amount of cheese passing through the weeper holes 102 has been sheared off as the mold is forced outwardly across the plate by hydraulic cylinder 116. Any cheese extending above the surface of mold 78 has been scraped off by scraper 93. When hydraulic cylinder 104 is energized, ejector plate 106 moves down and ejector fingers force the formed cheese pieces out of mold 78 into a brining trough.

Cheese is forced through outlet pipe 22 through outlet 24 at a temperature of 145 deg. Fahrenheit to 150 deg. Fahrenheit, a ph of 5.1 and a pressure of approximately 1000 per pounds per square inch. The mold is filled, and as it is being filled, the UHMW mold cap rises until the cap runners contact the bottoms of the support rails.

After the mold is filled, it is moved to a position over the extrusion mold. Hydraulic pressure of 3000 pounds per square inch is used to force the still plastic cheese into forming chambers 88.

As the cheese is forced into chambers 88, a skin is formed on each piece, the density of the cheese piece is made uniform and the cheese piece formed in the first mold is worked into a desired internal physical structure. By putting pressure on the cheese block at a separate station, and by extruding the block under great pressure, a uniform density is obtained.

The small cheese pieces formed are forced out of the mold into a trough of brine which transports them to a work station.

Because of their density, the flexibility of the pieces and their uniform size, the pieces formed can be fed to high speed machines for further processing, such as for breading or to packaging. Because the pieces are brined after being formed they can be brined in minutes instead of hours.

The weight of the pieces formed is uniform so they can be sold by the piece, rather than by weight.

The prototype device makes small pieces of cheese of uniform shape, at a rate of cheese input of 2400 pounds per hour. The cheese pieces formed have been of two sizes, rectangular pieces 3 inches long and one half inch one each side, and 3 inch long, five-eighths inches round. Practical sizes that can be made with the device are from less than one ounce to blocks of 1 to 2 pounds, two inch, by 3 inch by 4 inch in dimensions.

UHMW is used for the mold cap, the mold rub rails and the extrusion molds. UHMW is a linear polyethylene having a relative viscosity of 2.3 or greater, at a solution concentration of 0.05%, at 135 degrees Celsius in decahydronaphthalene.

Nominal weight average molecular weight of UHMW is 3 million or higher. UHMW is highly resistant to sliding abrasion and is chemically inert.

LEXAN is a trademark of General Electric Company. The material is a polycarbonate. It is used in this device to make the self-springing scraper. The scraper strips off any cheese extending above the surface of the extrusion mold as the mold is pushed past the scraper.

The venting plate is made of acrylic plastic. The plate must exhibit extreme flatness from edge to edge. Acrylic plastic has these properties.

The mold plate is reciprocated by a 4 inch diameter, 20 inch stroke, double acting hydraulic cylinder.

The extrusion molds are reciprocated by 2 inch diameter, 14 inch stroke hydraulic cylinders.

The cheese is forced into the extrusion mold by a six inch bore, 12 inch stroke double acting hydraulic cylinder. The pressure exerted on the cheese is 3100 pounds per square inch.

The ejectors are operated by two inch bore, 10 inch stroke double acting cylinders.

All hydraulic cylinders are operated with FDA approved hydraulic oil.

The device shown is a reciprocating device. The reciprocating device takes up little space and rapidly produces the required pieces, ejecting them into the brine trough. A rotating mold plate having multiple stations has been designed. At one station the mold is filled, at a second station the cheese is extruded into the extrusion mold, at a third station the extrusion mold is cooled, and at another station the pieces are ejected.

We claim:

1. A cheese extrusion device comprising:

a frame;

a mold plate slidably mounted within said frame; said mold plate having a top surface and a bottom surface, said mold plate having at least one opening formed therethrough, at one end thereof, from the bottom surface to the top surface;

upstanding mold side walls extending upwardly from the top surface of the mold plate, around the opening in the mold plate, defining a forming mold;

a mold cap mounted within the upstanding side walls of the mold; said mold cap being moveable within said side walls; the mold side walls and the mold cap forming an enclosed volume;

a cheese outlet;

an extruder operable to deliver warm, plastic, cheese, under pressure through the outlet;

an extrusion mold having a plurality of forming chambers formed therethrough forming an enclosed volume; said chambers extending from the top surface of the extrusion mold to the bottom;

a venting plate for venting air and cheese, having a plurality of weeper holes formed therethrough, mounted below the extrusion mold, each weeper hole being positioned below a forming chamber;

the mold plate being slidable from a first filling position, wherein the opening in the mold plate is positioned over the outlet, to a secondary extrusion position wherein the bottom of the mold plate blocks cheese flow from the outlet and the mold is positioned over the extrusion mold;

means for slidably driving the mold plate in succession into the fill position and into the extrusion position;

a fluid power cylinder mounted above the extrusion mold, operable when energized, when the forming mold is positioned over the extrusion mold, to force down the mold cap, extruding the cheese out of the forming mold into the forming chambers in the extrusion mold;

ejection means operable to force the cheese pieces formed in the forming chambers, out of the extrusion mold.

2. The device in claim 1:

wherein the volume of the extrusion mold is less than the volume of the forming mold.

3. The device in claim 1 wherein;

the extrusion mold is made of a material having the properties of high resistance to abrasion, low coefficient of friction, chemically inert, odor free, taste free and self lubricating.

4. The device in claim 1 wherein the extrusion mold is made of plastic.

5. The device in claim 1 further comprising:

a mold plate retainer having an internal perimeter formed therethrough, the internal perimeter of the mold plate retainer defining the area of movement of the mold plate;

support rails mounted above the mold plate, extending lengthwise, parallel to the direction of sliding movement of the mold plate;

mold cap rub rails, made of a low friction material, mounted on top of the mold cap, said rub rails mounted parallel to the support rails, below such support rails;

a flange surrounding the cheese outlet;

a low friction pad affixed to the flange; said low friction pad located adjacent to, and bearing on the bottom of the mold plate, in sliding engagement therewith;

wherein filling of the forming mold, causes the moveable mold cap to move upwards, until the rub rails contact the support rail bottom surfaces, stopping any further filling of the forming mold and providing a low friction surface for sliding motion of the mold plate within the internal perimeter of the mold plate retainer.

6. A method of forming small pieces of cheese comprising:

extruding warm plastic cheese, under pressure into a first mold;

positioning the first mold over a second mold, while the cheese is still plastic, said second mold having a plurality of forming chambers formed therethrough, the volume of the second mold being slightly less than the volume of the first mold;

sealing the bottom of the second mold with a venting plate, said venting plate having a plurality of weeper holes formed therethrough, each of said weeper holes being located under a forming chamber;

working the cheese in the first mold to obtain a constant density, by forcing the cheese in the first mold, under pressure, while the cheese is still plastic, into the plurality of forming chambers, in the second mold, until the forming chambers have been filled and a quantity of cheese is forced out of the weeper holes;

retaining the cheese in the second mold until a skin has formed on the surface of the cheese in the forming chambers;

shearing off any cheese extending above or below the surface of the second mold;

ejecting the cheese pieces out of the forming chamber into a brining tank; and brining the cheese pieces formed.

7. In a cheese extruder of the type in which warm plastic cheese is extruded from an outlet under pressure, into a forming mold, to form a cheese block, and the block ejected therefrom, wherein the improvement comprises:

a mold cap, slidably mounted within the forming mold; the mold cap being made of a material having a low coefficient of friction;

an extrusion mold, having a plurality of forming chambers formed therein; the volume of the extrusion mold being less than the volume of the forming mold; the extrusion mold being made of a material having the property of low coefficient of friction;

a vent plate, having a plurality of weeper holes formed therethrough, mounted below the extrusion mold, each weeper hole being positioned below a forming chamber;

means for positioning the forming mold over the extrusion mold, while the cheese in the forming mold is still plastic;

fluid power means, operable when energized, to force down the mold cap, wherein the cheese within the forming mold is forced into the forming chambers filling the chambers and venting out the weeper holes;

ejection means operable to eject the formed pieces from the extrusion mold.

8. The device as in claim 7 wherein the positioning means comprises:
- a frame;
- a pair of housings mounted on said frame, on either side of the outlet;
- a mold plate having a pair of openings formed therethrough at each end thereof;
- upstanding mold side walls extending upwardly from the top surface of the mold plate; around the openings in the mold plate, forming a pair of molds; one at each end of the mold plate;
- a flange formed around the cheese outlet;
- a mold plate retainer mounted above the cheese outlet flange, the internal perimeter of the mold plate retainer defining an area of movement of the mold plate; said retainer extending under both housings;
- fluid power means operable to move the mold plate within the area defined by the mold plate retainer, back and forth under the two housings.

9. The device as in claim 7 wherein the ejection means comprises:
- a pair of support legs mounted on either side of the extrusion mold;
- a scraper extending over the extrusion mold and in engagement therewith;
- fluid power means, operable when energized to force the extrusion mold outward on the support legs, under the scraper;
- an ejector plate;
- a plurality of ejector fingers extending downward from such ejector plate; said ejector fingers being mounted in alignment with the forming chambers;
- fluid power means, operable when energized to force the ejector plate, with its attached ejector fingers, into engagement with the cheese pieces formed, forcing the pieces out of the extrusion mold.

10. A cheese extrusion device comprising:
- a cheese outlet for providing warm plastic cheese under pressure;
- a frame extending around said outlet;
- a first housing mounted on said frame, on one side of the outlet;
- a second housing mounted on said frame, on the other said of the outlet;
- a flange extending outwardly around the perimeter of the outlet;
- a low friction pad affixed to the flange;
- a mold plate having openings formed at each end thereof;
- upstanding side walls formed on said mold plate at the openings, defining a mold; the bottom surface of said mold plate being in sliding engagement with the outlet flange;
- a mold plate retainer extending across said frame, within the housings, the internal perimeter of the mold plate retainer defining the area of travel of the mold plate;
- a pair of support rails affixed to each of the housings, extending from end to end of the frame, mounted above the mold plate;
- a mold cap mounted within each of the molds, movable in a vertical direction;
- a pair of mold cap rub rails mounted on top of the mold caps parallel to the support rails;
- fluid power means operable when energized to move the mold plate back and forth within the area defined by the internal perimeter of the mold plate retainer;
- support legs mounted to the frame below the housing extending outwardly from said frame, normal to the direction of travel of the mold plate;
- an extrusion mold having a plurality of forming chambers formed therethrough, slidably mounted on said first pair of support legs; said extrusion mold being mounted below the housing and in the area defined by the internal perimeter of the mold plate retainer;
- a venting plate fixedly mounted to the frame, said venting plate having a plurality of weeper holes formed therethrough, each of said weeper holes being located under a forming chamber;
- fluid power means mounted in the housings, operable when energized, when the forming mold, is above the extusion mold, to force down the mold cap, forcing the cheese in the mold into the extrusion mold;
- means operable when energized, to slide the extrusion mold outward on its support legs, shearing off any cheese extending into the weeper holes;
- an ejector plate slidable mounted on the housing, extending outwardly therefrom;
- ejector fingers extending from said ejector plate, said fingers corresponding to the forming chambers in the extrusion mold;
- fluid power means operable when energized to force the ejector plate, with its attached fingers into engagement with the cheese pieces in the extrusion mold forcing the cheese pieces out of the mold.

11. The method in claim 6 wherein the pressure applied to force the cheese into the second mold is greater than the pressure applied to the cheese in the first mold.

* * * * *